Oct. 24, 1961
H. A. SEELE
3,005,616
FLOW CONTROL VALVE
Original Filed Aug. 27, 1956
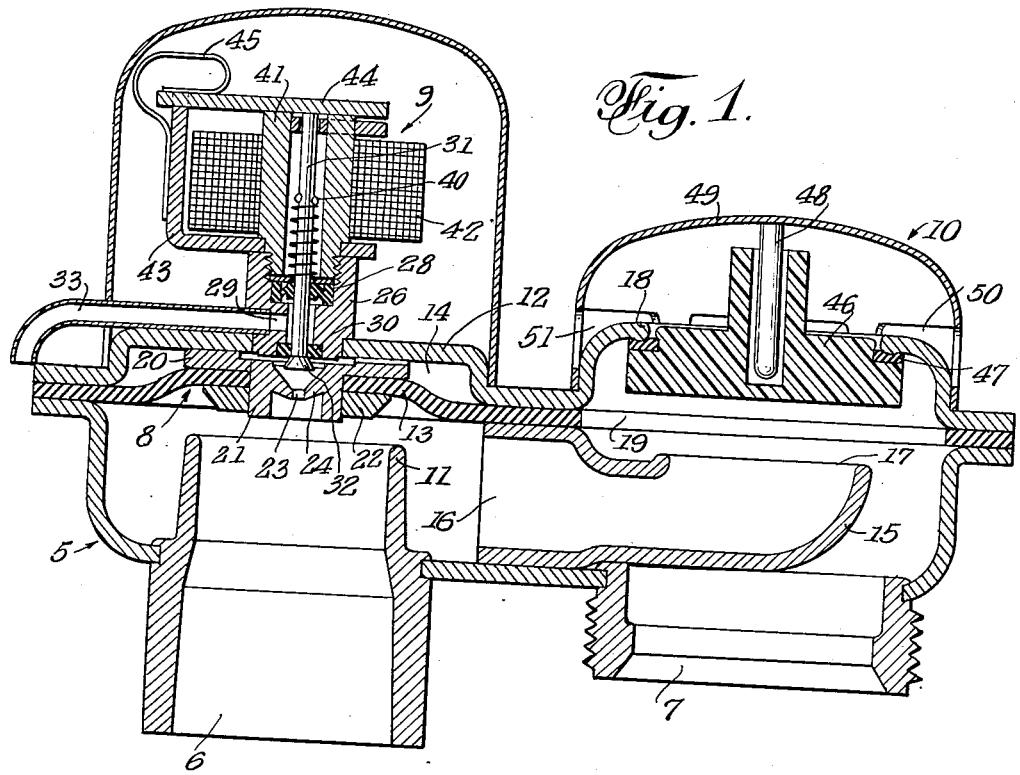
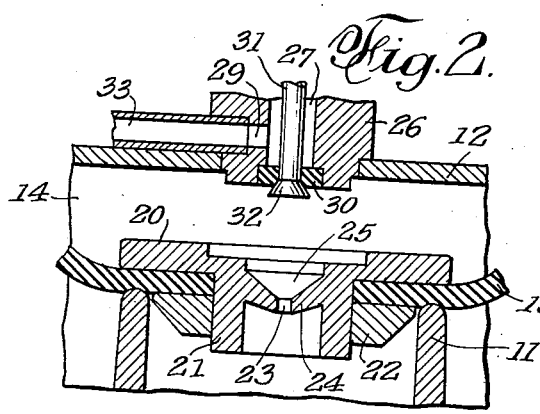
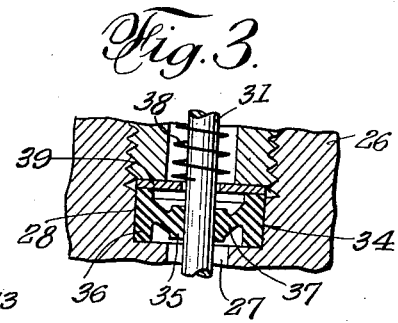
INVENTOR.
HAROLD A. SEELE
BY C. G. Stratton
ATTORNEY

United States Patent Office 3,005,616
Patented Oct. 24, 1961

3,005,616
FLOW CONTROL VALVE
Harold A. Seele, 2311-21 Southwest Drive,
Los Angeles 43, Calif.
Original application Aug. 27, 1956, Ser. No. 606,258. Divided and this application June 3, 1957, Ser. No. 663,112
1 Claim. (Cl. 251—46)

This invention relates to a valve for controlling flow of water in an irrigation or sprinkling system and it is an object of the present invention to provide a solenoid-controlled valve that is particularly efficient for controlling flow in such systems.

This application is a division of my pending application, Serial No. 606,258, filed August 27, 1956.

A further object of the invention is to provide a valve of the character referred to that operates on pressure differential on opposite sides of a diaphragm and to embody in said valve a solenoid-actuated valve stem provided with an effective and novel seal that enables light action forces to be applied to said valve.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

FIG. 1 is a vertical sectional view of a flow-controlling valve according to the present invention.

FIGS. 2 and 3 are enlarged detail views of portions of FIG. 1, showing the valve in a different position.

The control valve that is illustrated comprises, generally, a body 5 to conduct flow between an inlet 6 and an outlet 7, a shut-off valve 8 controlling said flow means 9 to operate the shut-off valve 8, and a vacuum breaker 10 to prevent reverse flow between said inlet and outlet. The inlet 6 and outlet 7 are connected in a flow line which said valve controls.

The inlet 6 is provided with a collar or annular valve seat 11 that extends into the body 5, the latter being closed by a cap plate 12 between which and the body is disposed a flexible diaphragm 13. Between the cap plate and diaphragm is formed a pressure chamber 14 that is disposed above and in alignment with the inlet collar 11. The cylindrical wall under the collar 11 serves as a dividing wall separating the interior of the body 5 between an inlet chamber within the collar 11 and outlet chamber surrounding it.

Above the outlet 7, the body 5 is provided with a flow diverter 15 that has a lateral inlet end 16 and an upwardly directed outlet 17. Above the latter outlet, the cap plate is provided with an open valve seat 18, said seat and outlets 17 and 7 being substantially vertically aligned. The diaphragm 13 is provided with an enlarged opening 19 that allows communication between the interior of the valve body and the opening defined by valve seat 18.

The shut-off valve 8 is carried by the diaphragm 13 in line with collar 11 and comprises a flange 20 on the side of the diaphragm toward chamber 14, a hub 21 extending from said flange through the diaphragm, and a nut 22 on said hub on the opposite side of the diaphragm. Said hub is provided with a central orifice 23 of bleeder size, the same being provided in an inverted conical wall 24 that defines an upwardly facing depression or cavity 25.

The shut-off valve 8 further includes a body 26 extending upwardly from cap plate 12, the same being formed with a central passage 27, an aligned counterbore 28, and a lateral opening 29, all in direct communication. Said passage 27 opens into chamber 14 and a valve disc 30 is interposed, the same being carried by the body 26. A valve stem 31 is disposed vertically in said passage 27 with ample clearance, the lower end of said stem being provided with a conically shaped valve end 32 that controls the aperture in valve disc 30.

Since the pressure chamber 14 is capable of receiving liquid from the inlet 6, the same passing through orifice 23 and, said liquid, after entering passage 27 (when stem 31 is depressed), may seek its way upwardly, although such liquid will drain through opening 29 and outwardly through tube 33, the counterbore 28 is fitted with a rubber seal 34 that is shown in FIGS. 1 and 3. Said seal is provided with a central stem-gripping hub 35, an outer annular bore-filling flange 36 and a connecting flexible web 37. Thus, regardless of the endwise movement of stem 31, the seal 34 will effectively intercept liquid in passage 27 and prevent the same reaching the valve-operating means 9 which, in this instance, is electrical. In its operation, the web 37 not only flexes between the two positions shown in FIGS. 1 and 3, but the hub 35 of the same frictionally grips stem 31 and yet allows the same to be moved endwise with a sliding movement through said hub.

A spring 38, between an abutment plate 39 above the seal 34 and an enlargement 40 on stem 31, biases said stem in a direction to cause the valve end 32 thereof to close the aperture in disc 30.

The valve-operating means 9 is shown as a magnetic core 41 extending upwardly from body 26 and surrounded by a coil 42. A frame 43 mounts a pivoted armature 44 that is subject to the magnetic flux generated in core 41 when the coil 42 is electrically energized. Normally, spring 38, in holding the aperture in valve disc 30 closed, holds the upper end of stem 31 projected somewhat above the upper end of said core. When attracted to the core against the bias of spring 45, the armature 44 will depress said stem and open said orifice to flow from pressure chamber 14 to drain 33.

Normally, the diaphragm 13 is engaged with the end of the collar 11 and the flow is arrested by said diaphragm because the total pressure on the diaphragm on its under side, is that of the area of the inlet, while the total pressure on the upper face of the diaphragm is that of the larger pressure chamber 14. Said chamber receives its pressure through orifice 23 and the same is retained because the valve end 32 is biased to close valve disc 30.

To institute flow between inlet 6 and outlet 7, the coil 42 is energized, causing depression of stem 31 and venting of pressure chamber 14. Upon such release of pressure from the top face of the diaphragm, the pressure in collar 11 is effective to move the same to the open position shown. This position is maintained so long as the coil 42 remains energized because the vent or drain 33 remains open.

Flow is stopped by de-energizing coil 42 to allow the spring 38 to bias the stem 31 and its valve end 32 to closed position. Now, as the pressure in chamber 14 builds up through flow past orifice 23, the pressure on the upper face of diaphragm 13 increases. Since there is a substantial pressure drop between the pressure on the under face of the diaphragm directly above the inlet and on marginal portions of said diaphragm, the total pressure on the upper face will eventually become greater than the total pressure on the under face and the diaphragm will move to flow-stopping position.

The vacuum breaker 10 comprises a valve disc 46 that is provided with a resilient valve ring 47 adapted to engage the valve seat 18 from beneath. Said disc is guided by a pin 48 carried by a hood or cover 49 in which openings 50 are provided, the same opening the valve seat to atmosphere.

When valve 8 is closed, disc 46 falls by gravity onto diverter outlet 17. Thus, any back flow from outlet 7 will apply its pressure to the upper side of said disc 46 to press the same closed and prevent such back flow from entering inlet 6. Valve seat 18 and openings 50 will drain such back flow, if excessive. When valve 8 is opened, the flow from the inlet will enter the diverter 15 and unseat disc 46, moving the same upwardly so that the valve seat 18 is engaged by valve ring 47. Now, the flow may enter the outlet 7.

While the foregoing has illustrated and described what is now contemplated to be the best mode of carrying out my invention, the construction is, of course, subject to modification without departing from the spirit and scope of the invention. It is, therefore, not desired to restrict the invention to the particular form of construction illustrated and described, but to cover all modifications that may fall within the scope of the appended claim.

Having thus described my invention, what I claim and desire to secure by Letters Patent is:

In a fluid valve of the pressure-operated diaphragm type with a diaphragm having a central opening therein, a pressure chamber, a bleeder valve to vent said chamber and having opening movement in a direction into the chamber a diaphragm hub for occupying such a diaphragm opening having a flange and adapted to receive a nut for clamping the diaphragm between the flange and the nut around the diaphragm hub, the hub having an inverted conical wall therein with a central orifice of bleeder size, the conical wall defining an upwardly facing depression facing said chamber and in register with the bleeder valve to provide a conical cavity for allowing movement of the bleeder valve thereinto when the fluid valve is open.

References Cited in the file of this patent

UNITED STATES PATENTS

| | | |
|---|---|---|
| 844,753 | Samuelson | Feb. 19, 1907 |
| 873,822 | Wolfe | Dec. 17, 1907 |
| 925,538 | Weaver | June 22, 1909 |
| 1,307,207 | Mitchell | June 17, 1919 |
| 1,587,516 | Forfar | June 8, 1926 |
| 1,597,254 | Vogel | Aug. 24, 1926 |
| 1,894,267 | Foresman | Jan. 17, 1933 |
| 2,265,294 | Lange | Dec. 9, 1941 |
| 2,573,369 | Snoddy | Oct. 30, 1941 |
| 2,588,242 | Hunter | Mar. 4, 1952 |
| 2,761,466 | Buchanan | Sept. 4, 1956 |
| 2,778,379 | Timmerman | Jan. 22, 1957 |
| 2,876,794 | Reedy | Mar. 10, 1959 |